(12) United States Patent
Yamanaka et al.

(10) Patent No.: US 8,327,512 B2
(45) Date of Patent: Dec. 11, 2012

(54) SLIDE SWITCH FOR BUCKLE APPARATUS

(75) Inventors: Satoshi Yamanaka, Osaka (JP);
Hirofumi Koizumi, Osaka (JP)

(73) Assignee: Hosiden Corporation, Osaka (JP)

( * ) Notice: Subject to any disclaimer, the term of this patent is extended or adjusted under 35 U.S.C. 154(b) by 42 days.

(21) Appl. No.: 12/877,761

(22) Filed: Sep. 8, 2010

(65) Prior Publication Data
US 2011/0067209 A1   Mar. 24, 2011

(30) Foreign Application Priority Data
Sep. 18, 2009 (JP) .................................. 2009-217276

(51) Int. Cl.
H01H 15/06 (2006.01)
A44B 11/25 (2006.01)

(52) U.S. Cl. ..................... 24/633; 24/606; 200/61.58 B; 200/547

(58) Field of Classification Search ................ 24/633, 24/641, 606; 200/61.58 B, 547
See application file for complete search history.

(56) References Cited

U.S. PATENT DOCUMENTS

| | | | | |
|---|---|---|---|---|
| 4,506,119 | A * | 3/1985 | Tanabe | 200/16 C |
| 5,657,861 | A * | 8/1997 | Takano et al. | 200/550 |
| 5,657,867 | A * | 8/1997 | Fu et al. | 206/308.1 |
| 6,005,201 | A * | 12/1999 | Tanaka et al. | 200/16 C |
| 6,138,332 | A * | 10/2000 | Mori | 24/633 |
| 7,360,288 | B2 * | 4/2008 | Takao | 24/633 |
| 7,534,974 | B2 * | 5/2009 | Sun | 200/550 |
| 7,538,283 | B2 * | 5/2009 | Muromachi | 200/61.58 B |
| 2003/0173203 | A1 * | 9/2003 | Miki | 200/529 |
| 2004/0111845 | A1 * | 6/2004 | Lee et al. | 24/633 |
| 2007/0215450 | A1 * | 9/2007 | Sun | 200/550 |
| 2009/0049665 | A1 * | 2/2009 | Maziere et al. | 24/633 |
| 2011/0232052 | A1 * | 9/2011 | Midorikawa et al. | 24/640 |

FOREIGN PATENT DOCUMENTS

| | | |
|---|---|---|
| JP | S56-13319 | 2/1981 |
| JP | S61-40910 | 3/1986 |
| JP | S61-57429 | 4/1986 |
| JP | H4-101611 | 9/1992 |
| JP | H07-073778 | 3/1995 |
| JP | H08-017290 | 1/1996 |
| JP | 2007-080764 | 3/2001 |
| JP | 2003-081057 | 3/2003 |
| JP | 2004-119115 | 4/2004 |
| JP | 2008-59808 | 3/2008 |

OTHER PUBLICATIONS

Office Action issued on Nov. 15, 2011 by the Japanese Patent Office for counterpart patent application JP 2009-217276.

* cited by examiner

*Primary Examiner* — Robert J Sandy
*Assistant Examiner* — Michael Lee
(74) *Attorney, Agent, or Firm* — David N. Lathrop

(57) ABSTRACT

A slide switch installed in a buckle apparatus includes a body 20, a slider 30 held slidably in the body 20, the slider 30 sliding when pressed by a movable part of the buckle apparatus, fixed contacts 41 to 43 placed in a direction in which the slider slides, on a surface of the body 20 that faces the slider 30, a movable piece 44 sliding on the surface of the body 20 on which the fixed contacts 41 to 43 are placed. The slider 30 has a size that obscures the fixed contacts 41 to 43 in the entire range in which the slider 30 slides. The fixed contacts 41 to 43 are unlikely to be affected by foreign matter etc. and adherence of foreign matter that degrades performance can be prevented.

4 Claims, 10 Drawing Sheets

AMOUNT OF SLIDER MOVEMENT

SLIDE SWITCH FOR BUCKLE APPARATUS

TECHNICAL FIELD

The present invention relates to a slide switch installed in a buckle apparatus into which a tongue (tongue plate) attached to a seatbelt is inserted and mated so as to determine whether a passenger fastens the seatbelt.

BACKGROUND ART

FIG. 1 shows the structure of a slide switch of this type disclosed in Japanese Utility Model Application Publication No. H4-101611. In this example, the slide switch includes a fixed plate 11 placed in a buckle apparatus and a movable contact 12 attached to the fixed plate 11.

Three fixed contacts 13 to 15 are formed on the fixed plate 11; the fixed contact 13 positions on one side in the width direction of the fixed plate 11 and extends across both ends of the fixed plate 11. The fixed contact 14 positions on the other side in the width direction of the fixed plate 11 and extends from one end to a midpoint in the fixed plate 11. The fixed contact 15 positions on the other side in the width direction of the fixed plate 11 and extends from the midpoint to the other end of the fixed plate 11.

The movable contact 12, which includes blade springs, has a pair of feet 12a on both ends in the width direction and the feet 12a have L-shaped holding parts 12b, which bends so as to get close to each other. An opening 12c is formed at the center of the movable contact 12 and a pair of arms 12d and 12e extend in the longitudinal direction of the foot 12a from one side of the opening 12c.

The movable contact 12 is slidably attached to the fixed plate 11 with the holding parts 12b in contact with the undersurface of the fixed plate 11 at both ends in the width direction of the fixed plate 11 and the pair of the arms 12d and 12e in contact with the fixed contacts 13 to 15. In FIG. 1, reference numeral 16 indicates an ejector of the buckle apparatus that slides when the tongue is inserted and reference numeral 17 indicates a compressed coil spring that urges the ejector 16 in a direction in which the tongue is removed.

A projection 16a of the ejector 16 positions in the opening 12c of the movable contact 12 and the ejector 16 is mated into the movable contact 12, and the movable contact 12 slides when pressed by the ejector 16. The arm 12d of the movable contact 12 is constantly in contact with the fixed contact 13 regardless of the slide position of the movable contact 12. The arm 12e makes contact with the fixed contact 14 or the fixed contact 15 depending on the attachment state of the tongue. This can be used to determine whether the tongue is removed from or inserted and mated into the buckle apparatus.

SUMMARY OF THE INVENTION

The problem with the slide switch of the above structure is that the fixed contact is like to be fouled or affected by foreign matter during or before installation in the buckle apparatus because the fixed contacts are much exposed.

On the other hand, grease is applied to the fixed contacts to prevent corrosion or improve slidability, but greasing makes foreign matter easier to adhere to the contacts and the adherence degrades detection performance. This problem may occur during use.

In addition, if grease is applied to the fixed contacts that are much exposed, grease itself is also exposed and may be transferred or adhere to unintended portions or components in the process. Accordingly, careful handling is required.

The present invention addresses the above problems with the object of providing a reliable and easy-to-use slide switch installed in a buckle apparatus for which the fixed contacts are unlikely to be affected by foreign matter and grease applied to the fixed contact is unlikely to be transferred or adhere to other portions.

The slide switch of the present invention that is installed in a buckle apparatus includes a body, a slider slidably held in the body, the slider sliding when pressed by a movable part of the buckle apparatus, a fixed contact placed in a direction in which the slider slides, on a surface of the body that faces the slider, and a movable piece sliding on the surface of the body on which the fixed contact is placed as the slider slides, in which the slider has a size that obscures the fixed contact in an entire range in which the slider slides.

EFFECTS OF THE INVENTION

According to the present invention, the fixed contact is constantly obscured by the slider, so the fixed contacts are unlikely to be affected by foreign matter and adherence of dust etc. can be prevented.

In addition, it is possible to prevent foreign matter from adhering to grease applied to the fixed contacts or prevent grease from being transferred or adhering to unintended portions or components.

Accordingly, the present invention achieves the reliable and easy-to-use slide switch installed in a buckle apparatus without degrading performance due to adherence of foreign matter etc.

DETAILED DESCRIPTION OF THE EMBODIMENTS

An embodiment of the present invention will now be described with reference to the drawings.

Figure 1:
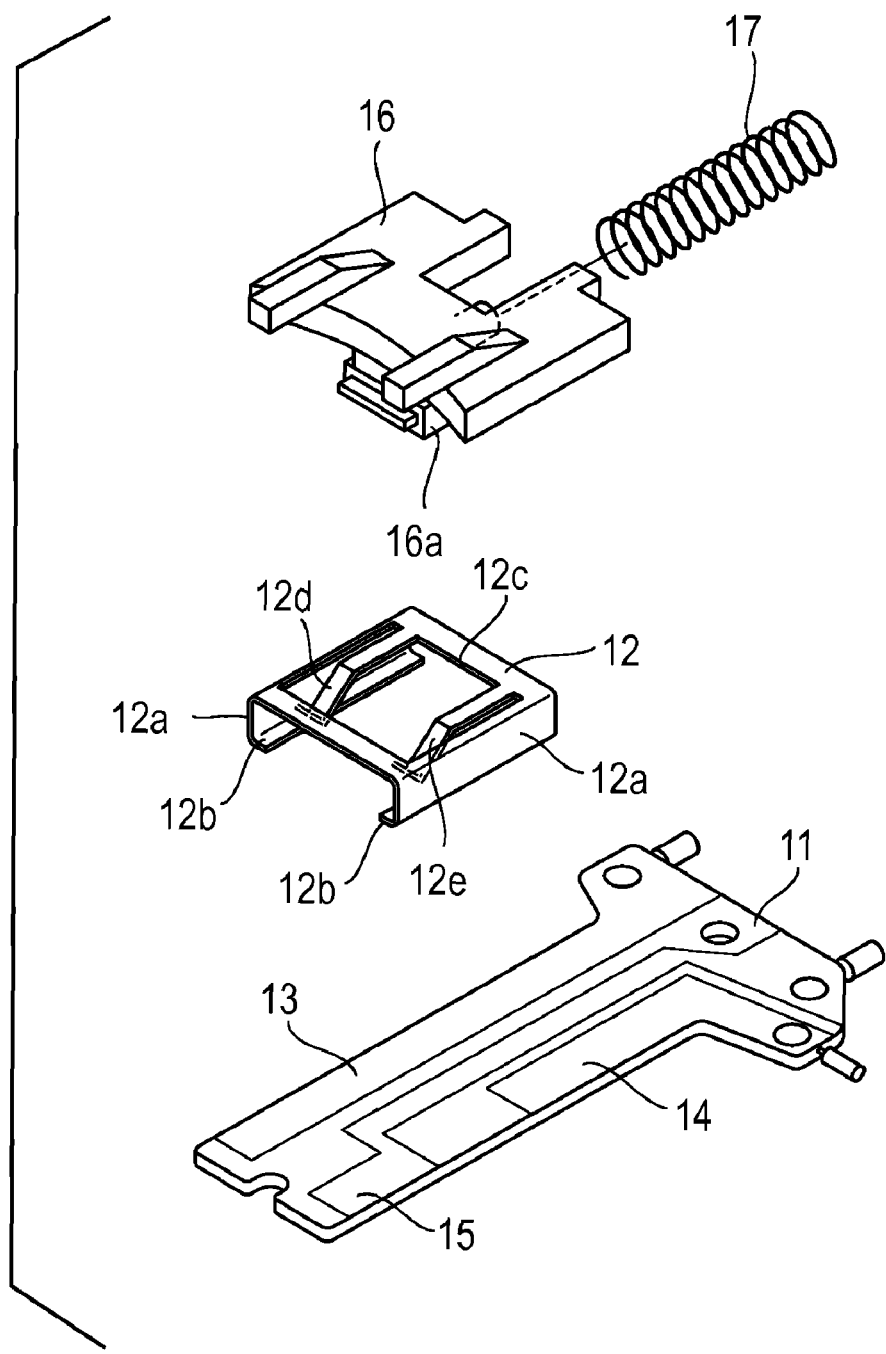
FIG. 1 illustrates a conventional structure example of a slide switch installed in a buckle apparatus.
Figure 2A:
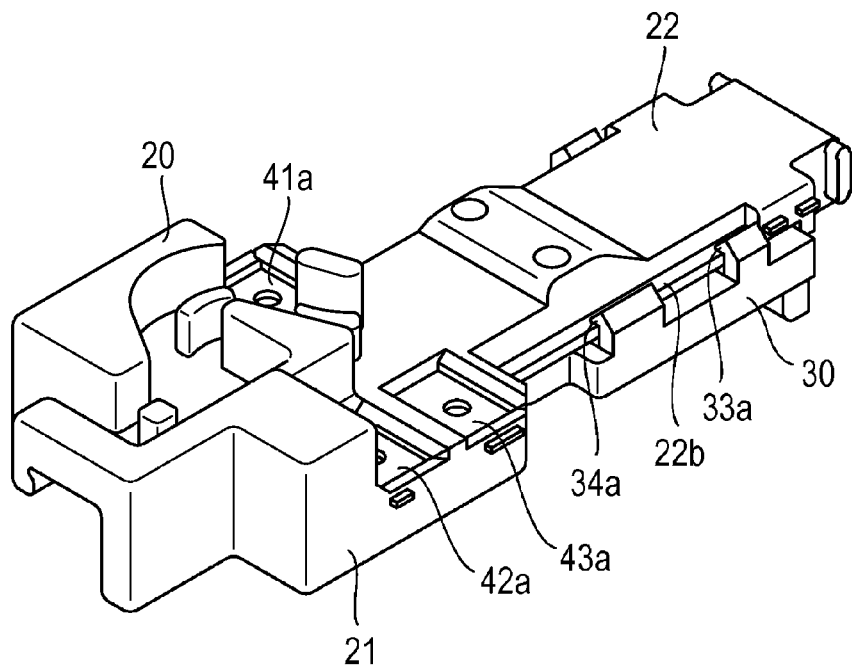
FIG. 2A is a perspective view showing the appearance of an embodiment of the slide switch installed in a buckle apparatus according to the present invention, seen from obliquely upward.
Figure 2B:
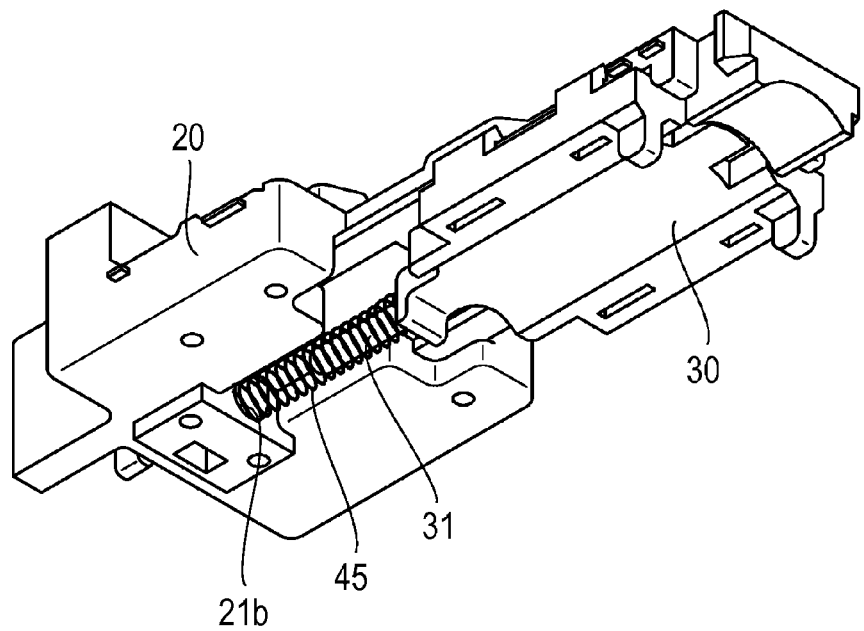
FIG. 2B is a perspective view showing the slide switch installed in a buckle apparatus in FIG. 2A, seen from obliquely downward.
Figure 3A:
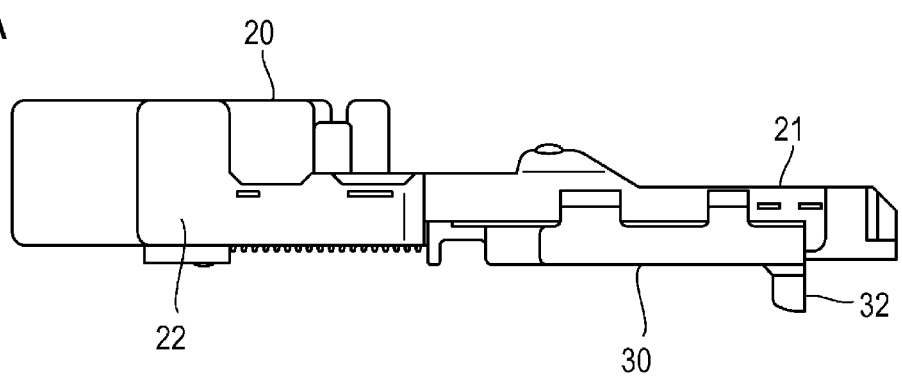
FIG. 3A is a front elevation view of the slide switch installed in a buckle apparatus in FIG. 2A.
Figure 3B:
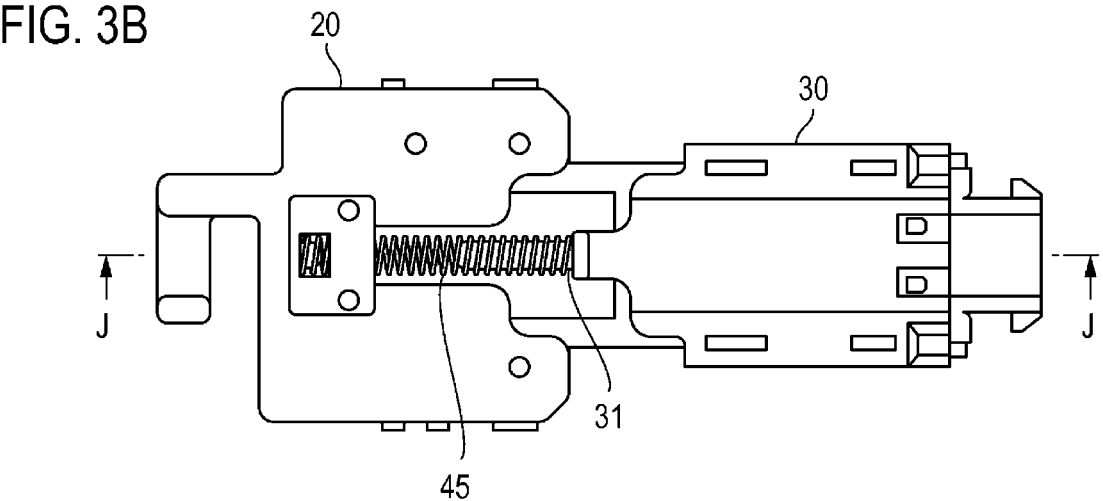
FIG. 3B is a bottom plan view of the slide switch installed in a buckle apparatus in FIG. 3A.
Figure 4A:
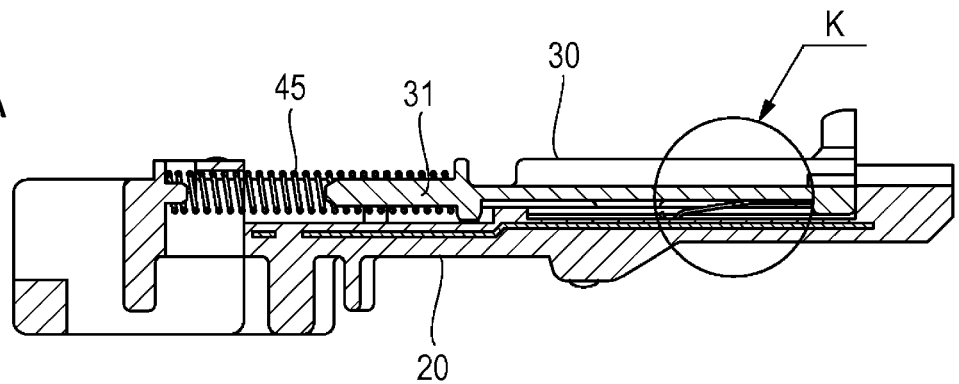
FIG. 4A is a cross-sectional view of the slide switch in plane J-J in FIG. 3B.
Figure 4B:
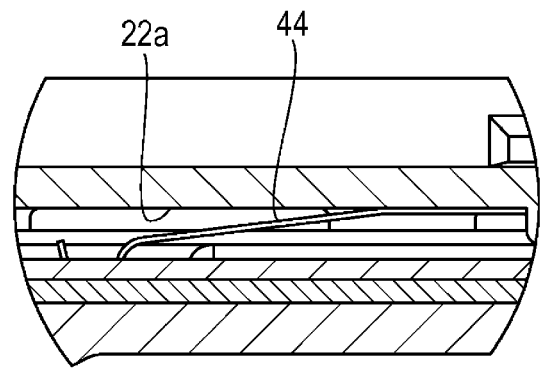
FIG. 4B is an enlarged view of portion K in FIG. 4A.
Figure 5:
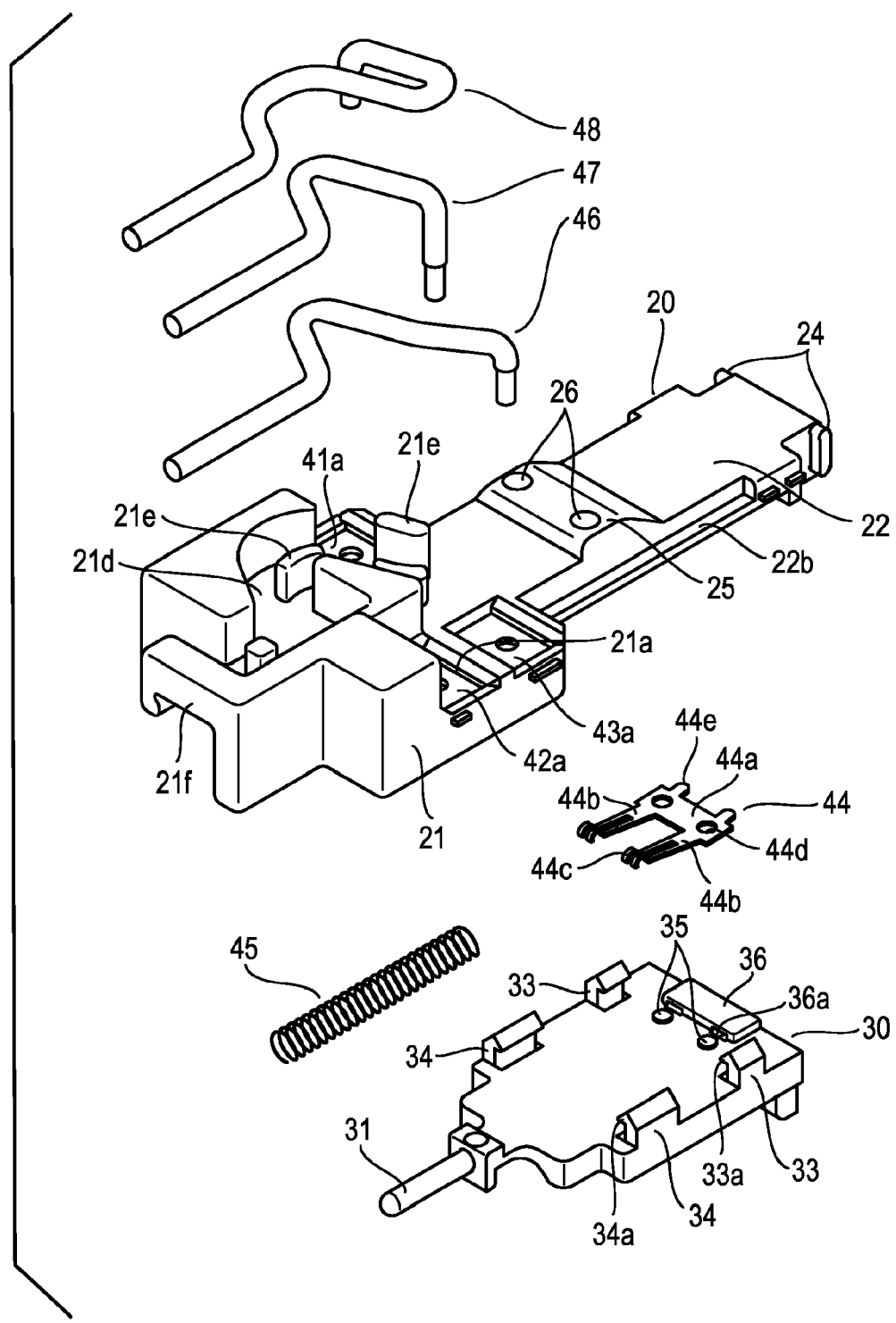
FIG. 5 is an exploded perspective view of the slide switch in FIG. 2A and harnesses, seen from obliquely upward.
Figure 6:
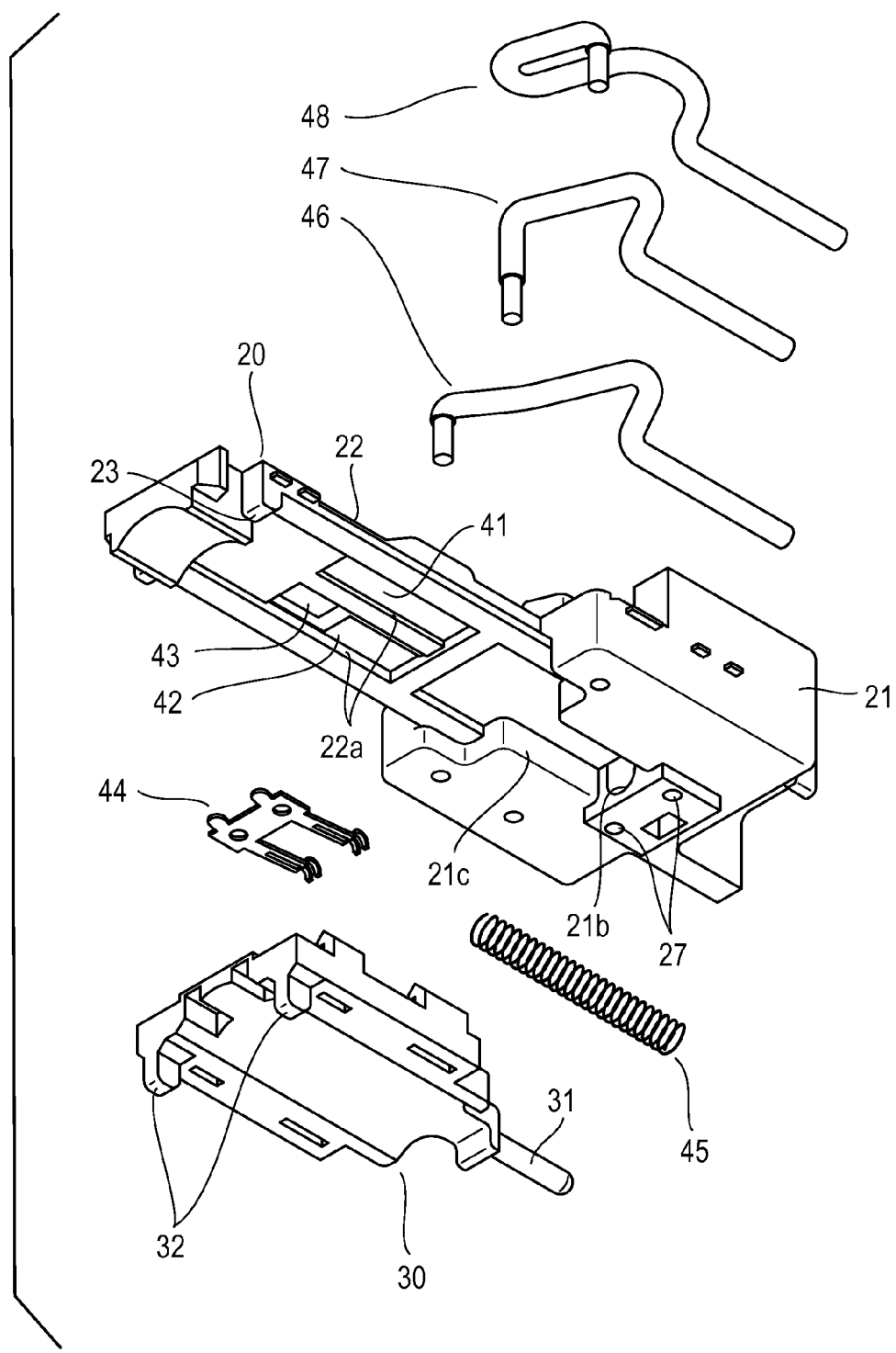
FIG. 6 is an exploded perspective view of the slide switch in FIG. 2A and the harnesses, seen from obliquely downward.

FIGS. 2A and 2B and FIGS. 3A and 3B show the appearance of an embodiment of the slide switch installed in a buckle apparatus according to the present invention; FIGS. 4A and 4B show the cross-sectional structure of the embodiment. FIGS. 5 and 6 are exploded perspective views. FIGS. 5 and 6 also show harnesses together.

The slide switch in this example includes a body 20, a slider 30, first to third fixed contacts 41 to 43, a movable piece 44, and a spring 45.

The body 20, which is made of resin, includes a base unit 21 and a substantially rectangular extending part 22 extending from the base unit 21, and the first to third fixed contacts 41 to 43 are formed by insert molding, as shown in FIGS. 5 and 6.

Slightly concave portions 22a are formed on an under surface of the extending part 22 and the first to third fixed contacts 41 to 43 are placed in these concave portions and are exposed externally. The first fixed contact 41 positions on a first half side in the width direction of the extending part 22 and extends in the longitudinal direction of the extending part 22. The second fixed contact 42 and the third fixed contact 43 position on a second half side in the width direction of the extending part 22 and extend in the longitudinal direction of the extending part 22 in sequence. One end of the first fixed contact 41 is aligned with one end of the third fixed contact 43 in the longitudinal direction of the extending part 22.

On the upper surface of the extending part 22, grooves 22b are formed on both ends in the width direction excluding the tips of the extending part 22. That is, the grooves 22b extend from the base end to the position before the tip of the extending part 22.

Three concave portions 21a are formed on the upper surface of the base unit 21; terminals 41a to 43a, which extend from the fixed contacts 41 to 43, position in the concave portions 21a. A hole 21b is disposed, in the longitudinal direction of the extending part 22, on an under surface of the base unit 21, and a groove 21c is formed from the extending part 22 to the hole 21b.

In this example, a groove 21d and a projection 21e, which are used to route and position harnesses, are formed on the upper surface of the base unit 21 and a hook 21f extending backward is formed. A stopper 23 projecting downward is formed at the tip of the extending part 22. Projections 24, which extend from the top of the extending part 22 and project in the width direction (horizontal direction) of the extending part 22, a convex portion 25, which is disposed in the middle of the extending part 22, projections 26, which are disposed on the convex portion 25, projections 27, which are disposed on the under surface of the base unit 21, etc. are used to perform positioning or prevent looseness when the body 20 is installed in a buckle apparatus.

The main body of the slider 30 is a substantially rectangular plate and a shaft 31 projects from one side in parallel with the surface of the plate. On the under surface of the side opposite to the side from which the shaft 31 projects, a pair of projections 32, which project downward, are placed at both ends in the width direction. A pair of engaging pieces 33 and a pair of engaging pieces 34 project from the upper surface of the slider 30 in the width direction orthogonal to the movement direction of the slider 30. A pair of engaging hooks 33a, which face each other, project from the pair of engaging pieces 33 and a pair of engaging hooks 34a, which face each other, project from the pair of engaging pieces 34. The slider 30 is made of resin.

The movable piece 44 includes blade springs, which have a fixed part 44a and a pair of feet 44b supported by the fixed part 44a. Arc-shaped contact parts 44c are formed at the tips (free end) of the feet 44b, which are bent relative to the fixed part 44a.

The movable piece 44 is attached to the upper surface of the slider 30. In this attachment, dowels 35 formed on the upper surface of the slider 30 are inserted into a pair of holes 44d formed on the fixed part 44a of the movable piece 44 and then the tips are heat-swaged. A pair of extending pieces 44e project from the fixed part 44a of the movable piece 44 in the direction opposite to the direction of the feet 44b and the extending pieces 44e are inserted into a pair of holes 36a formed in a side of a convex portion 36 projecting from the upper surface of the slider 30. This prevents the fixed part 44a from being floated and the movable piece 44 is well secured to the slider 30.

The slider 30 holding movable piece 44 is held in the body 20 with the engaging hooks 33a and 34a of the engaging pieces 33 and 34 engaged with the grooves 22b of the extending part 22 of the body 20 so that the slider 30 can slide in the extending direction of the extending unit 22. At this time, the spring 45 is attached with the shaft 31 of the slider 30 inserted into one end of the spring 45 and the other end inserted into the hole 21b of the body 20. That is, the spring 45 is placed between the body 20 and the slider 30.

In the slide switch configured as described above, the slider 30 is urged by the spring 45 including a compressed coil spring and the end surface is pressed against the stopper 23 projecting from the under surface of the extending unit 22 of the body 20 in the initial position.

Figure 7:
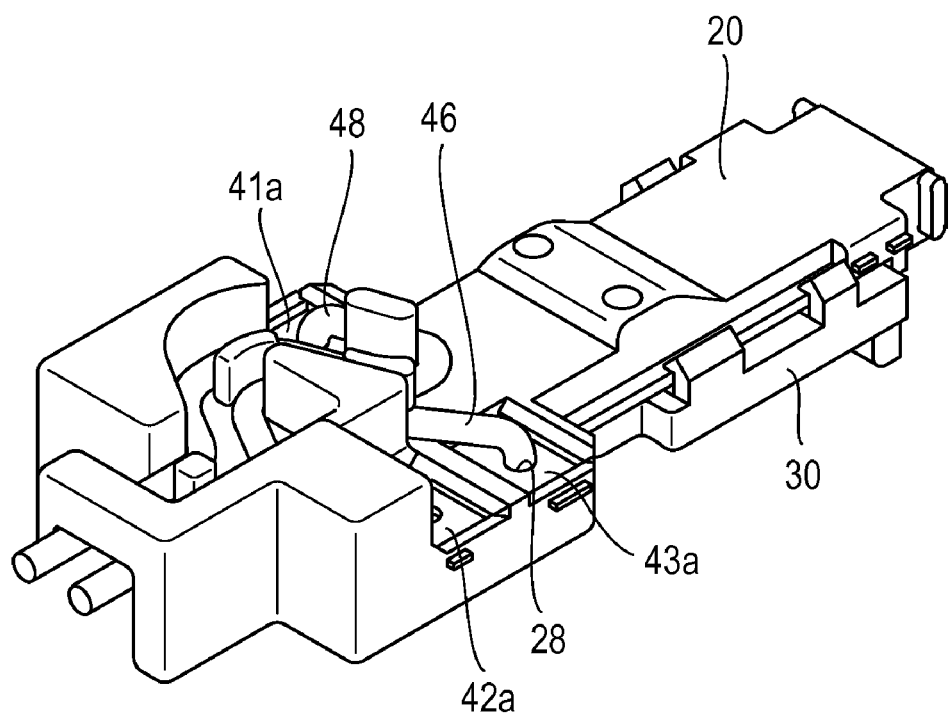
FIG. 7 is a perspective view showing an example of attaching the harnesses.

FIG. 7 shows the state where, for example, two harnesses 46 and 48 of three harnesses 46 to 48 shown in FIGS. 5 and 6 are attached to the slide switch. A hole 28 is formed so as to pass through the terminals 41a to 43a and the body 20, and the tips of the harness 46 and 48 are inserted into the hole 28 and soldered.

Next, the operation of the above slide switch will be described below.

Figure 8A:
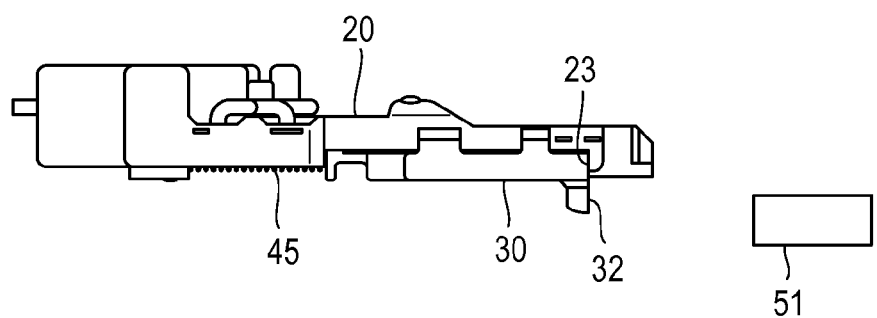
FIG. 8A shows the relation between the slide switch installed in a buckle apparatus in FIG. 2A and a movable part of the buckle apparatus.
Figure 8B:
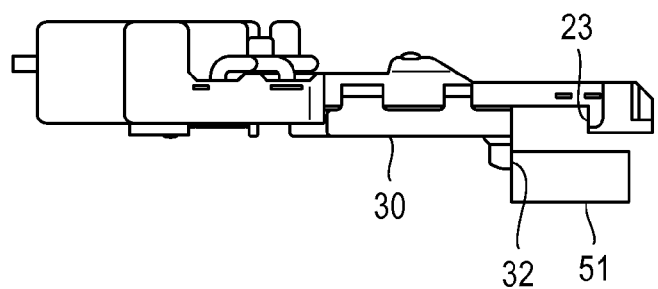
FIG. 8B shows the state in which the movable part in FIG. 8A moved.

FIGS. 8A and 8B show the relationship between a movable part 51 disposed in the buckle apparatus to which this slide switch is installed and the slide switch. The movable part 51 is simplified.

The movable part 51 slides when the tongue of the sheet belt is inserted into the buckle apparatus, makes contact with the projection 32 on the end surface of the slider 30 as shown in FIG. 8B, and presses the slider 30 to let it slide.

Figure 9A:
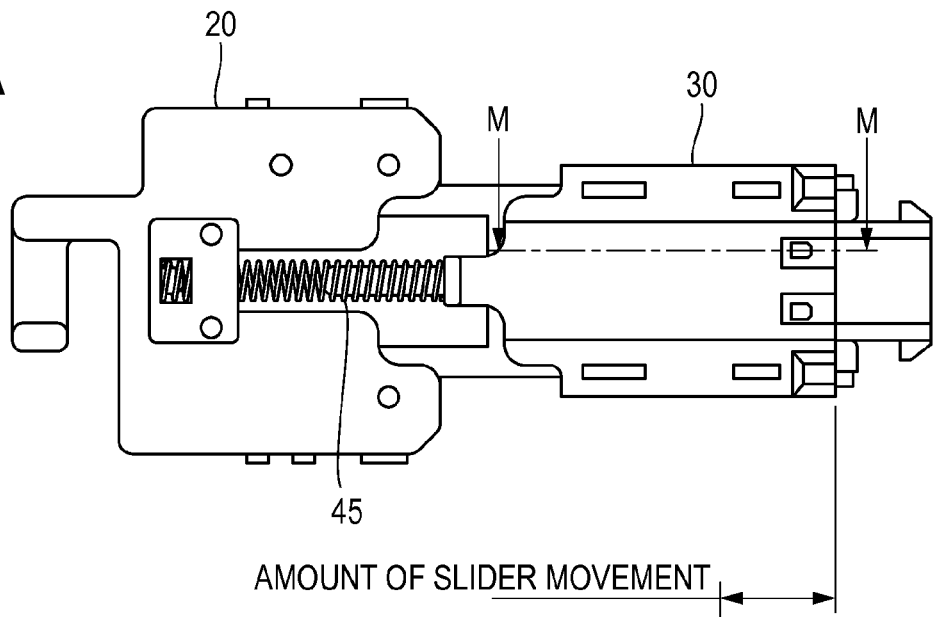
FIG. 9A shows the position of a slider when a tongue is unlatched in the slide switch installed in a buckle apparatus in FIG. 2A.
Figure 9B:
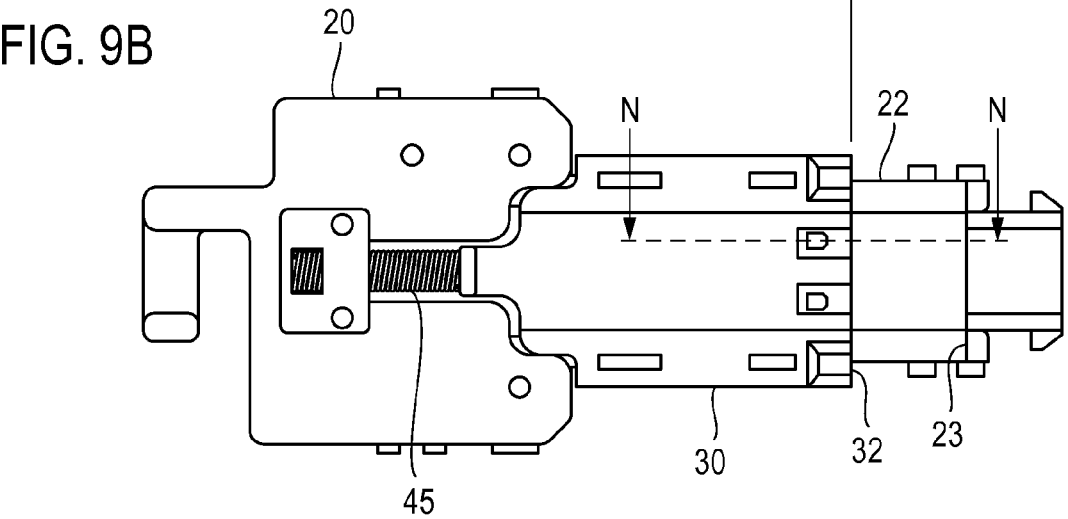
FIG. 9B shows the position of the slider when the tongue is latched in the slide switch installed in a buckle apparatus in FIG. 2A.
Figure 10A:
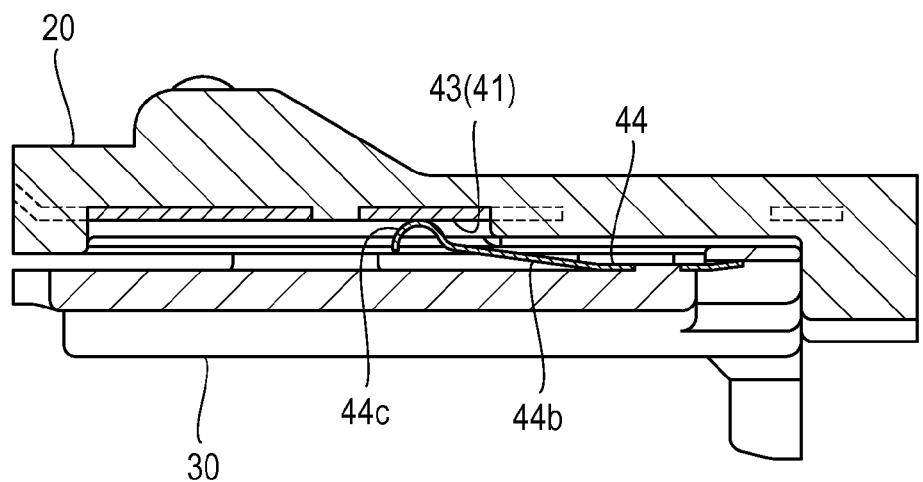
FIG. 10A is an enlarged sectional view of the slide switch in plane M-M in FIG. 9A.
Figure 10B:
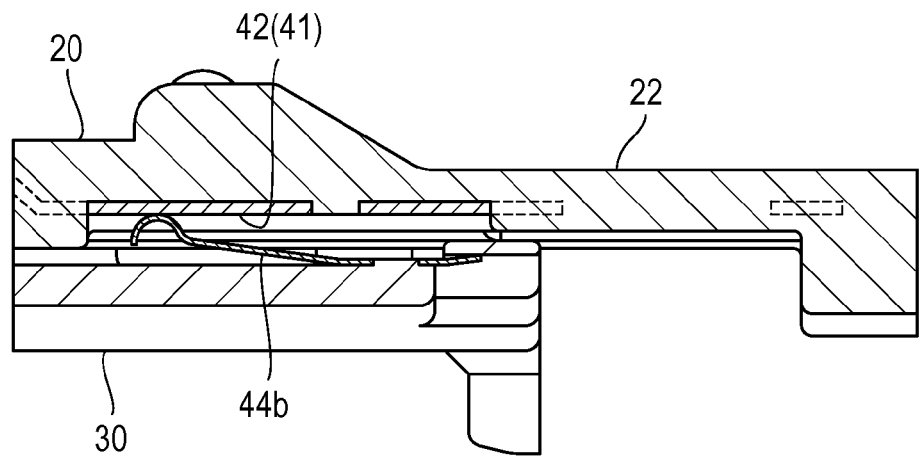
FIG. 10B is an enlarged sectional view of the slide switch in plane N-N in FIG. 9B.

FIGS. 9A and 9B show the initial position of the slider 30 when the tongue is unlatched and the movement position of the slider 30 when the tongue is latched. FIGS. 10A and 10B are enlarge views of the section M-M in FIG. 9A and the section N-N in FIG. 9B, respectively.

The fixed contacts 41 to 43 are placed in the movement direction of the slider 30 on a surface of the extending part 22 of the body 20, the surface closely facing the slider 30. The movable piece 44 slides on the surface of the body 20 on which the fixed contacts are placed as the slider 30 slides. The first fixed contact 41 extends across the entire sliding path of one of the pair of feet 44b of the movable piece 44 and the second fixed contact 42 and the third fixed contacts 43 extend in sequence in the sliding path of the other of the pair of feet 44b.

In the initial position of the slider 30, the contact parts 44c at the tip of the feet 44b of the movable piece 44 make contact with the first fixed contact 41 and the third fixed contact 43 and the first fixed contact 41 and the third fixed contact 43 are electrically connected (closed). On the other hand, in the movement position of the slider 30 shown in FIGS. 9B and 10B, the feet 44b of the movable piece 44 make contact with the first fixed contact 41 and the second fixed contact 42 and the first fixed contact 41 and the third fixed contact 43 are electrically disconnected (opened) and the first fixed contact 41 and the second fixed contact 42 are electrically connected (closed).

The contact state of the movable piece 44 changes as the slider 30 moves as described above, so it is possible to determine whether the tongue is latched into (insertion and mating state) or unlatched from (removal state) the buckle apparatus according to this state.

If the three harnesses 46 to 48 are soldered to obtain an electric signal, the ON signal in the initial position and the ON signal in the movement position can be obtained. If the two harnesses 46 and 48 are soldered as shown in FIG. 7, a detection method in which the ON signal in the movement position (tongue latch state) can be obtained. This detection method may be used.

When the tongue is removed from the buckle apparatus and the movable part 51 returns to the initial position in FIG. 8A, the slider 30 automatically returns to the initial position by the elastic force of the spring 45 in this example. However, if there is a mechanism for returning the slider 30 to the buckle apparatus side, the spring 45 is not necessary.

In the operation of the slide switch described above, the slider 30 has a size that obscures the fixed contacts 41 to 43 across the entire length of sliding motion as shown in FIGS. 9A and 9B. That is, the slider 30 covers the fixed contacts 41 to 43 to prevent them from being exposed externally. Accordingly, the fixed contacts 41 to 43 are unlikely to be affected by foreign matter, preventing foreign matter such as dust from being attached and performance from being degraded by attachment of foreign matter. Therefore, the slide switch with high dust resistance and high reliability can be obtained.

When grease is applied to the fixed contacts 41 to 43 to prevent corrosion and improve slidability, foreign matter is more likely to be attached. However, such a problem is solved in this example and grease is not exposed as in the fixed contacts 41 to 43, thereby preventing grease from being transferred or adhering to unintended portions or components in the process and simplifying the handling of the sliding switch.

In addition, quick-drying grease was conventionally used to prevent the adherence of foreign matter, but such restrictions are unnecessary in this example, expanding the range of choices of grease.

What is claimed is:

1. A slide switch installed in a buckle apparatus, comprising:
    a body;
    a slider held slidably in the body, the slider sliding when pressed by a movable part of the buckle apparatus;
    a plurality of fixed contacts placed in a direction in which the slider slides, on a surface of the body that faces the slider; and
    a movable piece sliding on the surface of the body on which the fixed contacts are placed as the slider slides;
    wherein the slider has engaging hooks on either side in a width direction orthogonal to a slide direction of the slider, the slider being held by the body through the engaging hooks; and
    the slider has a size that obscures all of the fixed contacts in an entire range in which the slider slides.

2. The slide switch installed in a buckle apparatus according to claim 1, wherein grease is applied to the fixed contacts.

3. The slide switch installed in a buckle apparatus according to claim 1 or 2, wherein the movable piece has a pair of feet, the fixed contacts include a first fixed contact, a second fixed contact, and a third fixed contact, the first fixed contact extends in a sliding path of one of the pair of feet, and the second fixed contact and the third fixed contact extend in sequence in a sliding path of the other of the pair of feet.

4. The slide switch installed in a buckle apparatus according to claim 1 or 2, wherein a spring for returning the slider is present between the body and the slider.

* * * * *